United States Patent

[11] 3,568,203

[72] Inventors Donald C. Venters
Nashua, N.H.;
John W. Krah; Belton H. Gardner,
Florissant, Mo.
[21] Appl. No. 679,680
[22] Filed Nov. 1, 1967
[45] Patented Mar. 2, 1971
[73] Assignee McDonnell Douglas Corporation
St Louis County, Mo.

[54] DIRECTION FINDING ANTENNA ASSEMBLY
10 Claims, 6 Drawing Figs.
[52] U.S. Cl. .................................................. 343/725,
343/113, 343/773, 343/858
[51] Int. Cl. ...................................................... H01q 21/28
[50] Field of Search ............................................. 343/113,
725, 773, 858

[56] References Cited
UNITED STATES PATENTS
2,954,558  9/1960  Honey et al................... 343/773
3,165,743  1/1965  Hatkin........................... (343/113UX)
FOREIGN PATENTS
649,944  2/1951  Great Britain................. 343/773

OTHER REFERENCES
R. C. Honey et al, " A Versatile Multiport Biconcial Antenna," Proc. I.R.E., V.45, Oct. 1957, pp. 1374— 1376 Relied ON. Complete Article, pp. 1374— 1383. TK570017
E. Chubb et al., " Omnidirectional Instantaneous Direction Finding System," IEEE Trans. on Aerospace and Electronic Systems, Vol AES-3, No. 2, March, 1967, pp. 250— 256. TL501I25
" Instantaneous Direction Finding System" by Elliott Chubb, John R. Grindon, Donald C. Venters, IEEE Conference on Military Electronics, 1965 Conference Record, pp 169— 173. Copy received in Library of Congress Nov. 2, 1965, UG 485.15 (343— 113)

Primary Examiner—Richard A. Farley
Assistant Examiner—Richard E. Berger
Attorney—Charles B. Haverstock ABSTRACT: A direction finding antenna assembly including a horn antenna structure and associated microwave circuitry capable of operating to instantaneously and continuously determine the direction from which a signal is being received. The assembly may also include in the same structure a collinear antenna array.

INVENTORS
DONALD C. VENTERS
JOHN W. KRAH
BELTON H. GARDNER

BY Charles B. Haverstock
ATTORNEY

DIRECTION FINDING ANTENNA ASSEMBLY

The present invention relates to an omnidirectional direction finding antenna assembly including associated microwave circuitry and more particularly to such an antenna assembly which may advantageously combine a collinear array for transmitting high power signals and a horn-type antenna structure for use in determining direction, which assembly is relatively simple and compact structurally and is capable of determining direction from signals received at a single location.

A need exists to be able to determine direction, and specifically the direction from which a signal is received, by simple and inexpensive means at one location. All known existing direction finding devices have been relatively complicated structurally and operationally, and many of the known devices require two or more spaced receiving locations and associated computer means. The known devices rely mainly on time of arrival and other information about the signals they receive, and they usually include means for solving complicated triangulations and related problems in order to determine direction. There have been other attempts to devise simple and inexpensive means for determining direction from received signals including attempts to devise means entirely at a single receiving location, but for various reasons the known devices have been unsuitable and unsatisfactory and have enjoyed limited usefulness. In part, this is because the known devices have been relatively complicated and expensive to construct and difficult to adjust and operate. For example, the known devices require complicated waveguide structures and other means for producing phase and other changes in the received signals and signal components, they have been relatively large and cumbersome, and for the most part they require equipment at more than one location including complicated expensive computer means. For these and other reasons, known direction finding devices have not enjoyed wide usage, have not been particularly accurate, and have not been small enough and compact and lightweight for installation on stationary as well as on movable objects such as on aircraft, space vehicles, tanks, ships and other devices especially where space and weight limitations are critical.

These and other shortcomings and disadvantages of the prior art are overcome by the present invention which teaches the construction and operation of a relatively simple, inexpensive direction finding antenna which combines in a single assembly a collinear antenna array, a horn-type antenna structure and associated microwave circuitry. The subject structure has omnidirectional characteristics and can be made to be relatively small and compact thereby substantially increasing the number of places where it can be installed and used. The structure of the present device also simplifies its operation by simplifying the manner in which different signals and signal components are handled and combined to produce direction finding information.

It is therefore a principal object of the present invention to provide improved direction finding means.

Another object is to provide relatively simple, compact and inexpensive means for determining direction from signals received at a single receiving location.

Another object is to simplify the construction and operation of direction finding equipment.

Another object is to improve the accuracy and reliability of direction finding equipment.

Another object is to provide improved means for combining a collinear array with a horn-type antenna structure.

Another object is to teach the construction and operation of an antenna assembly providing omniazmuthal coverage for a collinear antenna array and for a horn antenna combined in the same structure.

Another object is to provide an integral direction finding antenna structure which can be mounted on a fixed ground support or on a moving object such as an airplane, a space vehicle, a tank, a ship and so forth.

Another object is to provide improved means for combining signals and signal components to determine direction.

Another object is to minimize the peripheral equipment required in a direction finding system.

Another object is to provide improved means for introducing phase change in microwave signals.

Another object is to minimize the effects of environmental conditions on a direction finding system.

Another object is to minimize the size and weight of direction finding means.

These and other objects and advantages of the present invention will become apparent after considering the following detailed specification which covers a preferred embodiment thereof in conjunction with the accompanying drawings, wherein:

FIG. 5 is an enlarged exploded perspective view of a typical hybrid circuit for use with the present device; and FIG. 6 is a diagrammatic view showing a typical operating condition of the subject device.

Figure 1:
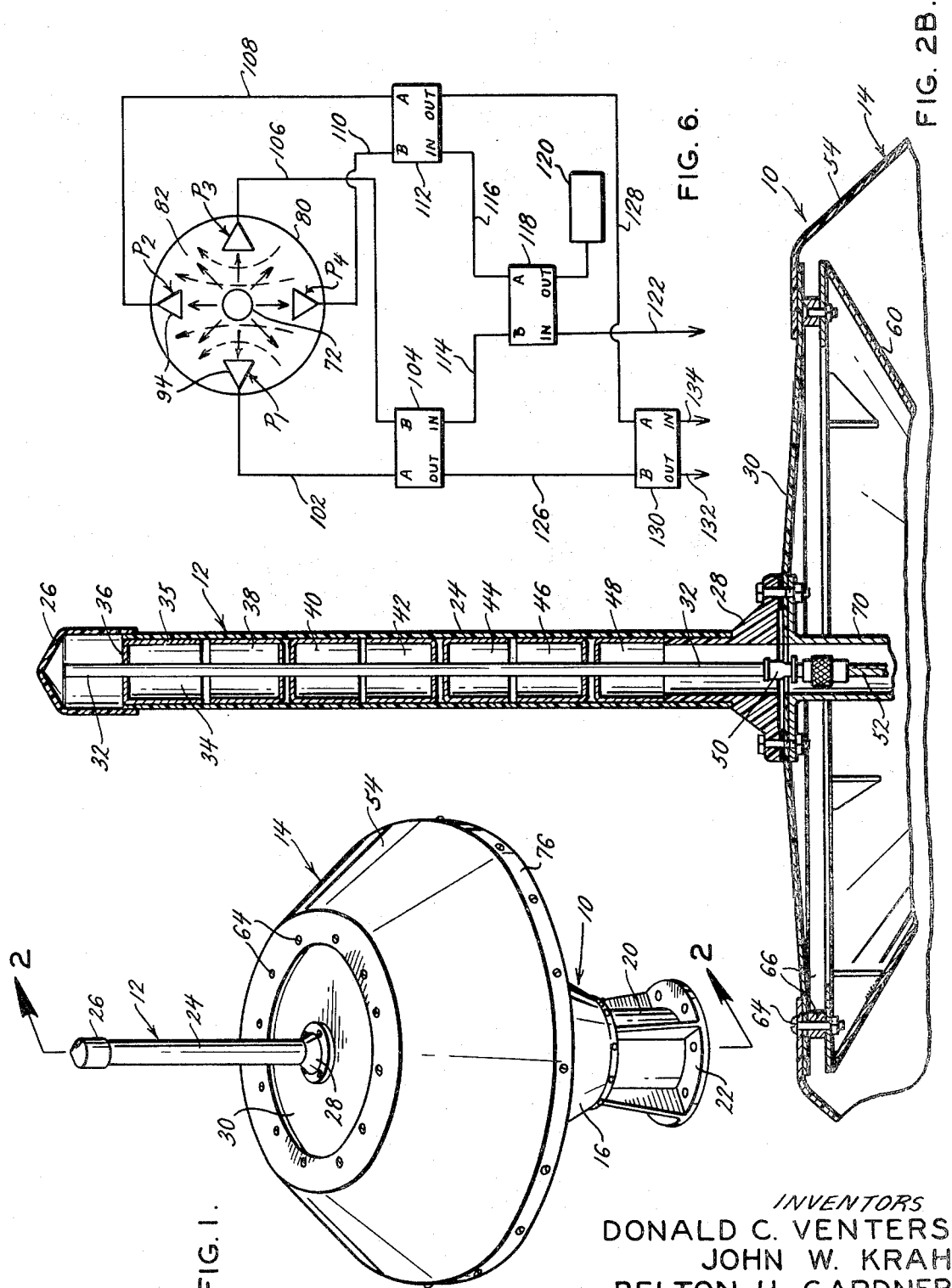
FIG. 1 is a perspective view of a direction finding antenna assembly constructed according to the present invention.
Figure 2:
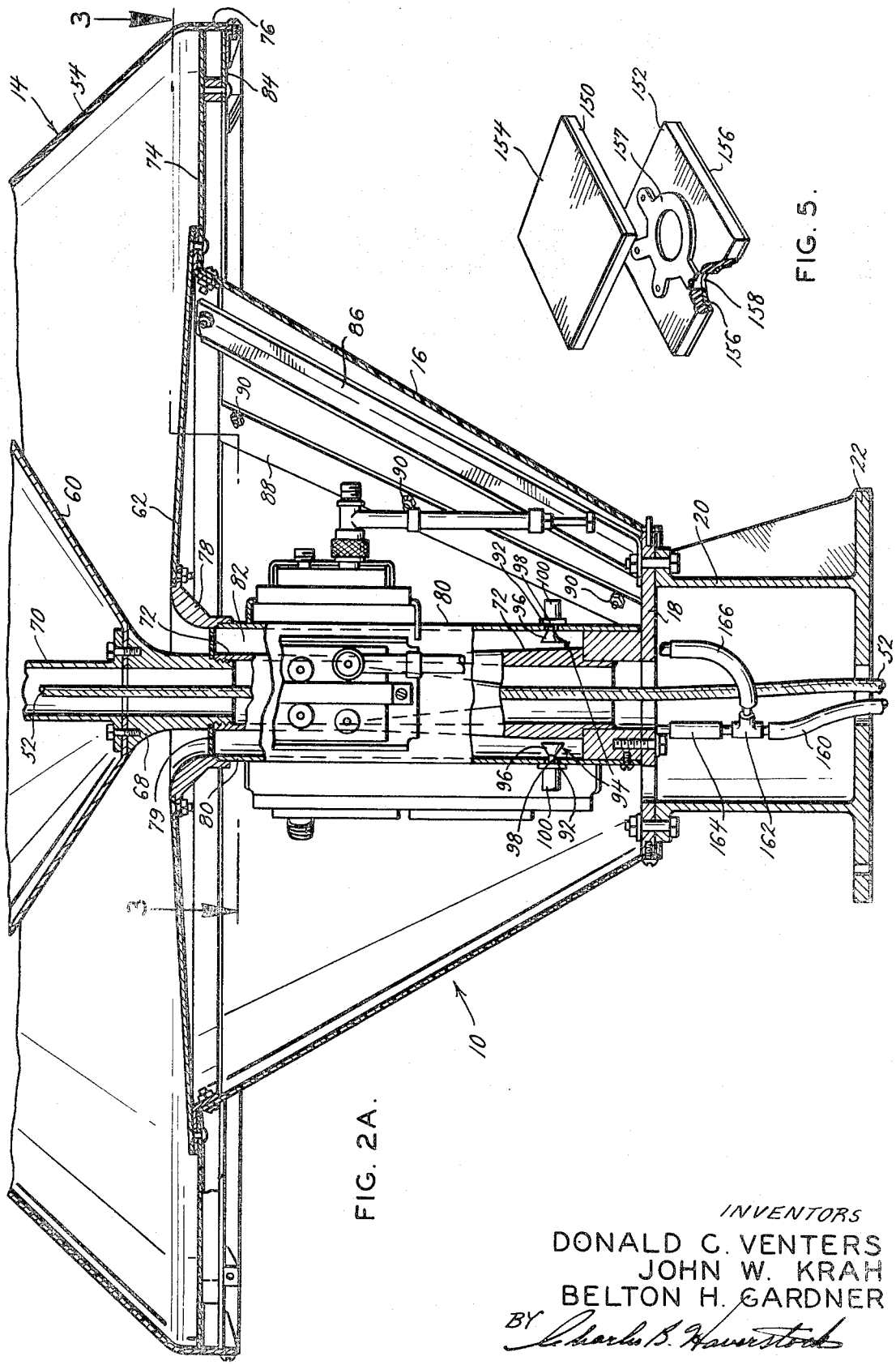
FIGS. 2A and 2B are cross-sectional views taken on line 2–2 of FIG. 1.

Referring to the drawings more particularly by reference numbers, number 10 refers generally to an antenna assembly which combines in a single structure a collinear antenna array 12 and a horn-type antenna device 14 constructed according to the present invention. The collinear array 12 is preferably mounted above the horn portion 14 as shown in FIGS. 1 and 2B and the horn 14 is in turn mounted above a frustoconical housing 16 in which many of the connections and operating elements employed in association with the subject assembly 10 are positioned. The lower end of the frustoconical housing 16 is attached to a support member 18 which is connected to a tubular member 20, and the lower end of the tubular member 20 is connected to a mounting disc 22 for mounting the assembly 10 on a post or other suitable member (not shown). The subject assembly can be mounted on a movable object or vehicle such as on an airplane, a space ship, a tank, a ship and so forth.

The subject antenna assembly is designed and constructed primarily for determining the direction from which signals are received and this is done by the subject means which includes an integral assembly that can be located entirely at one receiving location. All known direction finding devices have required means located at more than one receiving location or they have been relatively complicated expensive devices which are difficult to adjust and use and for the most part are not particularly accurate and reliable. The present device overcomes these and other shortcomings and disadvantages of known direction finding devices.

The collinear antenna array portion 12 of the subject assembly 10 includes a tubular nonconductive housing 24 constructed of a material such as fiberglass. The upper end of the housing 24 is closed by a nonconductive cap 26 and the lower end is attached to an annular member 28 also of a nonconducting material such as a phenolic material. The member 28 is in turn connected to a larger diameter wall member 30 which extends outwardly therefrom to form a protective cover for over the horn portion 14.

A plurality of axially aligned conductive radiator elements are positioned inside the tubular housing 24 as shown in detail in FIG. 2B. The radiator elements are mounted at spaced locations along a central conductor 32 which is equivalent to the center conductor of a coaxial cable. The conductor 32 extends substantially the full length of the housing 24 on the axis thereof, and the uppermost radiator element 34 is located near the upper end thereof as shown. The element 34 is cup-shaped and includes a tubular sidewall portion 35 positioned adjacent to the inner surface of the nonconductive housing 24, and an upper end wall portion 36 which extends inwardly from the sidewall 35 to adjacent the conductor 32. Spaced downwardly along the conductor 32 from the upper most radiator element 34 are located a pair of similar cup-shaped radiator elements 38 and 40 positioned with there end walls in spaced opposed relationship as shown. Another pair of spaced cup-shaped radiator elements 42 and 44 are spaced further down the conductor 32 in the housing 24, and still another pair 46 and 48 are located still further down along the conductor 32. The size and shape of the radiator elements, their positions, and the number employed will very depending on the characteristics and frequencies of the signals to be transmitted and received. Collinear arrays of generally the same construction are well known in the art.

The lower end of the central conductor 32 is connected to a coaxial coupling fixture 50 which extends through an opening formed in the annular member 28 as shown in FIG. 2B. The coupling fixture 50 includes means for attaching the conductor 32 to the upper end of a coaxial cable 52 which extends therefrom downwardly through the subject structure and out the bottom through an opening formed in the mounting disc 22. The lower end of the coaxial cable 52 is connected to suitable transmitter and/or receiver means which are not part of the present invention.

The horn portion 14 of the subject antenna assembly is positioned below the protective closure member 30 inwardly of a downwardly and outwardly sloping wall member 54 which forms a continuation of the closure wall 30. The wall members 54, like wall 30, is formed of a nonconducting material such as fiberglass, and in combination with the closure wall 30, the housing 24, and the wall 16, forms a weatherproof and preferably airtight enclosure for the subject assembly.

The horn portion of the subject device is formed of spaced members 60 and 62 shaped to provide opposed horn surfaces. The upper horn forming member 60 is spaced somewhat below the closure member 30 and is attached thereto by suitable means including threaded members 64 and spacer ring 66. The lower smaller end of the upper horn forming member 60 is located on the axis of the subject structure and is attached to a tubular member 68 which is in alignment with and connected to another tubular member 70 which extends downwardly from the collinear array 12. The members 68 and 70 form a central vertical passage through the structure for the coaxial cable 52 as aforesaid, and the outer surface of the member 68 is shaped to form a smooth downwardly and inwardly extending continuation of the upper horn surface. The upper end of another tubular member 72 is round and is threadedly attached to the lower end of the member 68. The member 72 extends downwardly therefrom, and the lower end of the tubular member 72 is more nearly square in shape. The transition from the round upper end of the member 72 to the square lower end thereof is apparent in FIGS. 2A and 3.

The lower horn forming member 62 also annular in shape and has its outer edge connected by suitable means to a downwardly extending peripheral flange 76 formed on the closure member 54. The inner edge of the member 62 is connected to the upper end of another annular member 78 which is positioned extending around the smaller diameter member 68, and the members 68 and 78 together define therebetween an annular throat for the horn portion 14. An annular nonconductive spacer 79 is shown positioned between the members 68 and 78 for support. The lower end of the member 78 is connected to the upper end of another cylindrical tubular member 80 which extends downwardly through the housing 16. The tubular members 72 and 80 together define an annular, through not a uniform cross section, space 82 which extends substantially the full height of the housing 16 and communicates at its upper end through the throat with the space defined between the horn forming members 60 and 62.

The upper horn forming member 60 is preferably spaced below the upper shield member 30 as aforesaid, and as shown in FIG. 2A the lower horn forming member 62 is preferably spaced above an annular wall member 84 which extends outwardly from the housing 16 and is connected to the lower flange portion 76 of the closure member 54. The spaces formed immediately above and below the horn members 60 and 62 respectively serve as radial chokes to reduce undesirable currents that may exist above and below the horn members 60 and 62, and the same spaces also help to control the elevation of the radiation side lobes associated with the horn portion.

Figure 3:
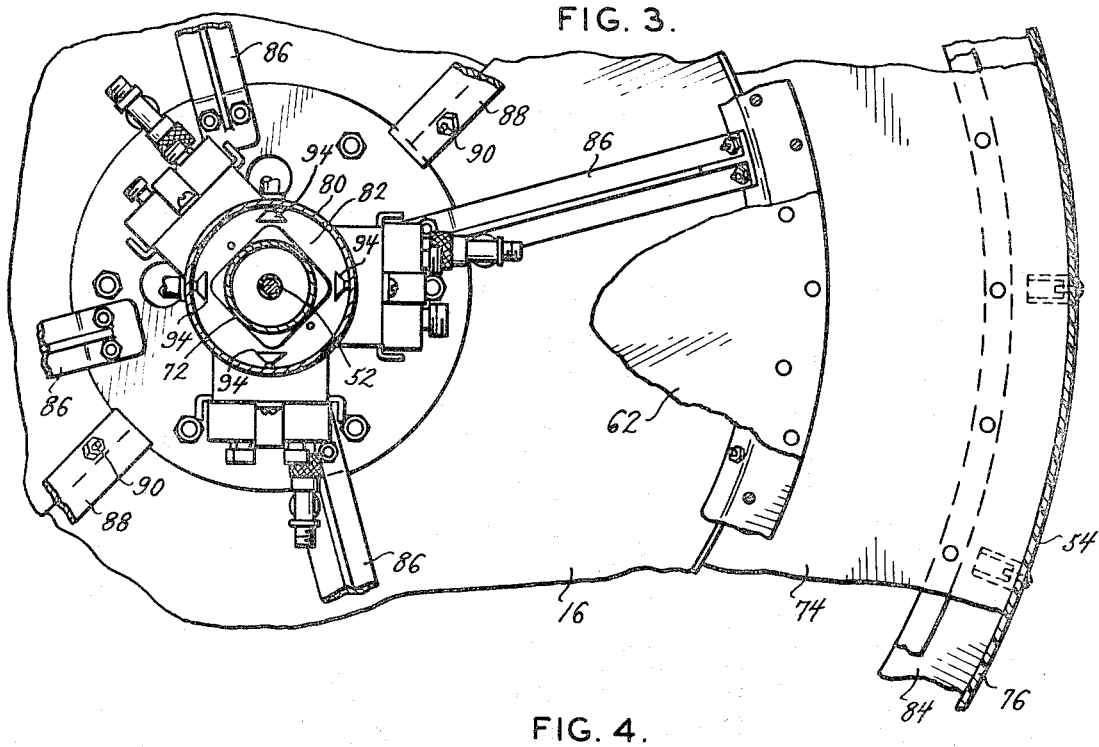
FIG. 3 is a fragmentary cross-sectional view taken on line 3–3 of FIG. 2A.
Figure 4:
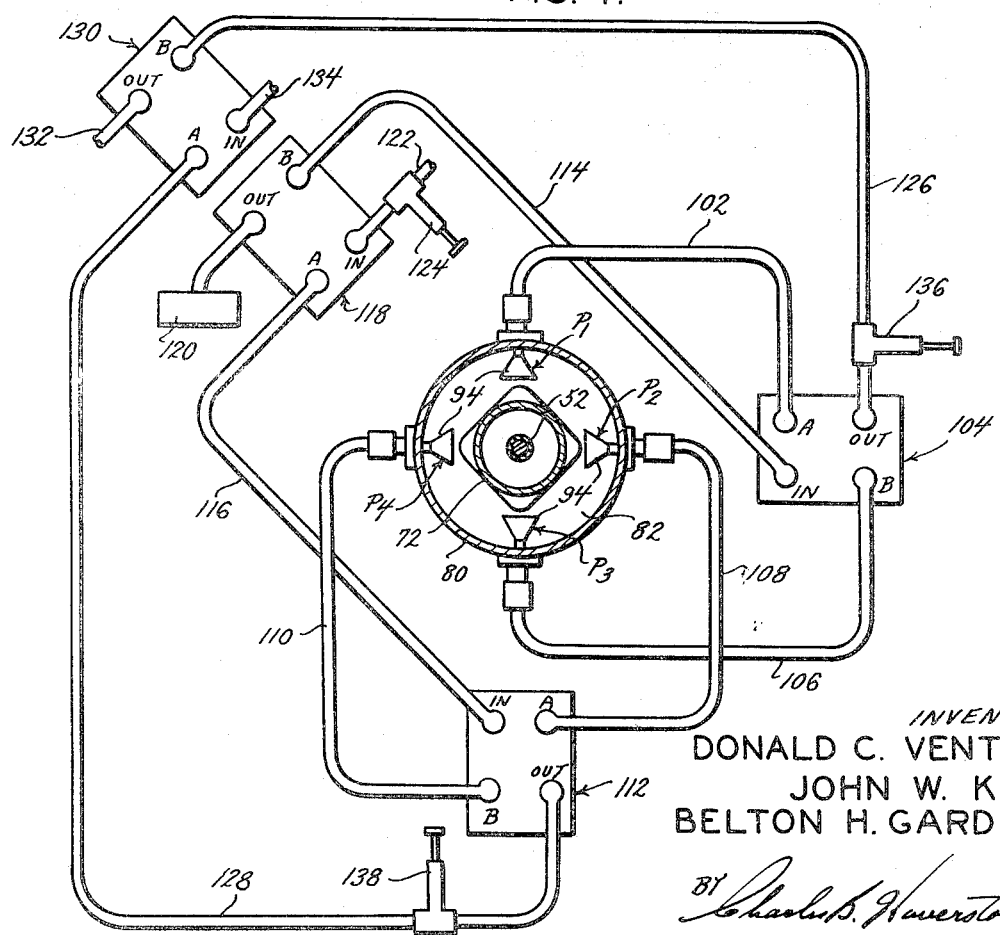
FIG. 4 is a diagrammatic view showing a typical coaxial cable hookup for the present structure.

The components included in the housing 16 are important to the operation of the subject device as a direction finding device, and their details are shown in FIGS. 2A, 3 and 4. The structural details of the housing 16 itself are shown in FIGS. 2A and 3 and include four strengthening members 86 constructed and positioned to give strength and rigidity to the housing 16 which is shown formed of two semiround wall members attached together by overlapping end portions 88 an suitable threaded fasteners 90. The structural details of the housing 16 can be varied considerably and the housing preferably should be constructed to be weatherproof and should be sufficiently strong to withstand the environment in which it is used.

The tubular member 80 (FIG. 2A) which extends vertically through the housing 16 has four spaced openings 92 located 90° apart near to its lower end adjacent to the lower end of the inner tubular member 72. A microwave coupling probe assembly 94 is mounted extending through each of the openings 92, and each probe assembly has a probe portion 96 which extends to adjacent the inner tubular member 72. The probes 96 are shown as being frustoconical in shape and each probe is connected to the inner conductor 98 of an associated coaxial coupling member 100 which in turn is connected to the end of an associated coaxial cable. The arrangement and connection of the probe assemblies 94 to the various cables are shown diagrammatically in FIG. 4 wherein the probe assemblies 94 are identified as assemblies $P_1$, $P_2$, $P_3$ and $P_4$ and are arranged on the tubular member 80 in diametrically opposite pairs as shown in FIG. 3.

The probe assembly $P_1$ (FIG. 4) is coupled by coaxial cable 102 to input coupling port A of a hybrid circuit 104 sometimes called a hybrid ring circuit and sometimes a stripline $\pi$ hybrid. The details of a typical hybrid circuit for use in the present device are shown in FIG. 5 and will be described later. The probe assembly $P_3$ located on the opposite side of the tube 80 from the assembly $P_1$ is coupled by coaxial cable 106 to another input coupling port B of the same hybrid circuit 104. In like manner, the probe assemblies $P_2$ and $P_4$ are coupled by coaxial cables 108 and 110 to coupling ports A and B respectively of another hybrid circuit 112.

The hybrid circuits 104 and 112 also have other coupling ports marked "In" and "Out" ports. The "In" ports are so labeled because at these ports occur a combination of the in-phase components of the input signals which are fed to the ports A and B of the said hybrid circuits. Similarly, the "Out" ports are the ports where the combined out-of-phase components of the input signals exist. In-phase signals occur at the "In" ports whenever equal amplitude in-phase input signals are fed to the input ports A and B. When this condition occurs there will be no signal at the "Out" ports. By the same token, whenever equal amplitude out-of-phase signals occur at the input ports A and B an output signal will be present at the "Out" ports but there will be no signals at the "In" ports.

The "In" ports of the hybrid circuits 104 and 112 are coupled respectively by coaxial cables 114 and 116 to the B and A input ports respectively of another hybrid circuit 118. The "Out" port of the hybrid 118 is coupled by suitable coaxial connection means to a loading device 120 and an "In" port is coupled by another coaxial cable 122 to the input of the receiver and/or transmitter device (not shown). The cable 122 may include tuning means 124. The "Out" ports of the hybrid circuits 104 and 112 are coupled by other cables 126 and 128 respectively to the B and A input ports of yet another hybrid circuit 130 which has its "cOut" and "in" ports coupled by cables 132 and 134 respectively to the receiver and/or transmitter device. The cables 126 and 128 are shown having associated tuning means 136 and 138 similar to the tuning means 124.

The hybrid circuits 104, 112, 118 and 130 may be of a construction similar to the hybrid circuit shown in FIG. 5. The hybrid circuit shown in FIG. 5 is constructed of two dielectric plate members 150 and 152 each having a copper or similar conductive layer or plating 154 and 156 applied to one or both surfaces thereof. One of the conductive layers on the member 152 (and possibly also on member 150, if provided) is etched away leaving only the portion shown which represents a circuit 157 having certain predetermined operation conditions. The members 150 and 152 are then connected together using suitable fasteners (not shown) with the circuit portion 157 between them. Suitable properly located coupling holes or ports 158 for the A, B, "In" and "Out" ports are provided in the layers 156 and 152 for coupling associated coaxial connectors thereto. The coaxial connectors or cables are connected with their inner conductors connected to the circuit portion 157 at the corresponding locations and their outer conductors connected to the layer 156. The hybrid circuits are mounted for convenience and protection inside of the housing 16 adjacent to the outer tubular member 80 as shown in FIGS. 2A and 3.

FIG. 2A shows a side view of a typical tuning device similar to the tuning devices 124, 136 and 138 (FIG. 4). The particular form of tuner shown is an impedance matching tuner which has certain convenience advantages. Such tuners generally have relatively good characteristics particularly with narrow radio frequency RF bandwidths. The tuners may have many different forms, however, depending on the frequency an bandwidth requirements.

Means are also included in the present device as shown in FIG. 2A for pumping dry air to the inner portions of the device. This is done to prevent humidity and other environmental conditions from adversely affecting the operating characteristics and to prevent damage to the device due to corrosion and otherwise. The means for pumping in dry air include conduit 160 which is connected through a T-junction 162 to other conduits 164 and 166 that communicate with the space inside the housing 16. The dry air pumped in displaces the existing air in the structure and maintains the inside of the device in a substantially dry environment. The temperature can also be controlled, if desired.

It is now apparent that the subject antenna assembly combines two different antenna portions mounted collinearly relative to each other including the collinear array 12 which is provided for transmitting high power omnidirectional signals from the subject structure, and the horn portion 14, the operation of which will be described. The signals produced by the horn portion as already indicated are coupled to requisite circuitry including the hybrid circuits which operate to produce signals from which continuous and instantaneous determination of direction is made. The construction and operation of the subject assembly enables it to maintain omniazimuthal coverage for both antenna portions and at the same time provides relative simple and accurate direction finding means. The relative simplicity and compactness of the subject assembly also gives it the substantial additional advantages of greatly expanding its utility and the number of possible mounting locations where it can be installed. It also means that the subject assembly can be made relatively cheaply for a device of this type. Furthermore, any collinear antenna array which operates independently of a ground plane can be used for the collinear array portion of the present device, and the coupling means for the collinear array including the coaxial cable 52 can be positioned extending through the other portions of the subject assembly without adversely interfering with the operation thereof and this is an important advantage from the structural standpoint.

The electromagnetic energy received by the horn portion of the subject device in the space between the spaced horn forming members 60 and 62 establishes therebetween an electromagnetic wave which has components in the transverse electromagnetic mode (TEM) and in the transverse electric mode ($TF_{10}$). These waves are guided into the throat portion of the horn between the members 68 and 78 and downwardly into the space between the concentrically arranged spaced tubular members 72 and 80. The curved construction of the throat provides a smooth transition between the larger annular horn space and the smaller coaxial space defined between the tubular members 72 and 80. This transition is important to the operation of the device because it converts the combination of the input TEM and $TE_{10}$ modes which exist between the members 60 and 62 into a combination of modes in the lower smaller coaxial horn space which include a TEM mode and a $TE_{11}$ mode. The energy in these latter modes is sensed by the coupling probe assemblies 94 and in turn fed to the input ports of the various hybrid circuits.

FIG. 6 shows the coaxial waveguide portion of the subject horn taken at the location of the coupling probes 94. The solid line arrows which radiate outwardly from the center conductor 72 represent the energy in the TEM mode that exists at the probe assemblies at a particular instant of time, and the dashed arrows represent the energy that exists at the same instant of time in the $TE_{11}$ mode. The dashed arrows illustrate the azimuth arrival angle for a signal which is received at a 90° angle where zero degrees is represented by the horizontal line extending through $P_1$ and $P_3$. Under these condition the various coupling probes 94 will product output signals which can be represented respectively by the equations:

1. $E = A \sin wt + B \sin \Phi \sin(wt - \delta)$
2. $E = A \sin wt + B \cos \Phi \sin(wt - \delta)$
3. $E = A \sin wt - B \sin \Phi \sin(wt - \delta)$
4. $E = A \sin wt - B \cos \Phi \sin(wt - \delta)$ where:

A is the amplitude induced due to the TEM mode.
B is the amplitude induced due to the $TE_{11}$ mode.
$\Phi$ is the azimuthal angle of arrival of the signal, and
$\delta$ is the net phase difference between the TEM and $TE_{11}$ modes due to the difference in the propagation constants of the two modes.

The system is preferably designed so that the angle $\delta$ equals zero at the coupling probes. The signals produced in the coupling probes pass through equal length coaxial lines or cables to the two stripline $\pi$ hybrid circuits 104 and 112 wherein they are combined and outputs are produced to represent the algebraic sum and difference of the input signals. If the "In" and "Out" ports of the hybrid circuit 104 are the difference "Out" ports, and the "In" and "Out" ports of the hybrid circuit 112 are the sum "In" ports, then the signals at these ports can be presented by the equations:

5. $E\ Out_{104}(P_3 - P_1) = 2B \sin \Phi \sin wt$
6. $E\ In_{104}(P_1 + P_3) = 2A \sin wt$
7. $E\ In_{112}(P_2 + P_4) = 2A \sin wt$
8. $E\ Out_{112}(P_2 - P_4) = 2 \cos \Phi \sin wt$ The hybrid circuits 104 and 112 therefore operate to separate the input signals that exist in the two modes in the coaxial section of the horn according to the in-phase and the out-of-phase components. In like manner, hybrid circuit 118 is coupled to combine the in-phase components it receives from the "In" ports of the hybrid circuits 104 and 112 according to the following equations:

9. $E\ In\ (104 + 112) = 4A \sin wt$.
10. $E\ Out\ (104 - 112) = 0$

The output of the hybrid circuit 118 at its "In" port is therefore a constant phase, constant amplitude signal which is independent of the azimuth angle $\Phi$ and hence is useful as a reference signal. This signal is present in the coaxial connector 122. In an ideal system the output signal at the "Out" port of the hybrid 118 is also zero. In practice, however, this is usually not the case and this signal may have a small value due to tolerances in the construction of the subject device and so on. This small component can usually be absorbed by providing the load 120 connected as shown to prevent interaction thereof with the desired signal component.

The signal components present at the "Out" ports of the hybrids 104 and 112 are coupled to the B and A input portions respectively on the hybrid circuit 130 as aforesaid and are combined therein additively or subtractively to produce outputs at the "In" and "Out" ports thereof. The signals produced at the "Out" port of the hybrid 112 are made to follow a path which is 90° longer than the path followed by the signals produced at the "Out" port of the hybrid 104. This is accomplished by making the coaxial connection 128 longer than the coaxial connection 126 by an amount or wave length sufficient to produce the 90° phase shift. The hybrid 130 combines the inputs it receives from the circuits 104 and 112 and produces output signals on one or both of the coaxial cables 132 and 134. These signals can be presented by the equations:

11. E Out $(104-112) = 2 B \sin(wt - \Phi)$
12. E in $(104+112) = 2 \sin(wt + \Phi)$ These signals at the output ports of hybrid circuit 130 change in phase as a linear function of the azimuth angle $\Phi$, and comparison of these signals with the reference signals present at the "In" port of the hybrid circuit 118 enables the azimuth angle of arrival of the signal received at the antenna to be determined. In this way the present device is able to determine direction.

In addition to the novel construction and operation of the subject antenna assembly as described above, the subject assembly provides certain other advantages which further contribute to its usefulness and distinctiveness. For example, use of coupling probe assemblies 94 instead of more conventional coupling devices such as waveguides is an important structural and operational improvement and one that significantly reduces the cost of the present device. The construction and connection of the coaxial-stripline circuitry employed also provides advantages including advantages of increased flexibility at reduced costs, and the combination in a single compact assembly of two distinct antenna structures as shown and described substantially expands the usefulness of the present assembly including its use in connection with radar and other devices without the usual interference complications attendant to antenna devices which combine in a single structure high power transmitting means and a horn-type portion. The combination of two different antenna devices in a single relatively compact structure also allows for mounting the device in many more places including on a fixed tower as well as in an airplane, space ship, tank and so one. Furthermore, the transmitting portion of the subject assembly in some cases can be eliminated altogether and the assembly is then even more readily adapted for installations in small limited spaces. Because of the omniazumuthal coverage provided by the subject assembly there is also relatively little degradation of the coverage due to the location in which it is mounted. Good omniazmuthal coverage characteristics are especially important in direction finding devices.

Thus there has been shown and described a novel antenna assembly which fulfills all of the objects and advantages sought therefor. Many changes, modifications, variations, and other uses and applications of the subject assembly will, however, become apparent to those skilled in the art after considering this specification and the accompanying drawings. All such changes, modifications, variations, and other uses and applications which is not depart from the spirit and scope of the invention are deemed to be covered by the invention which is limited only by the claims which follow.

We claim:

1. A direction finding antenna assembly comprising a horn portion including spaced annular reflectors defining an annular outwardly opening space therebetween, said space being shaped to respond to the receipt of signals transmitted from remote locations to establish therein signal mode configurations having characteristics corresponding to the direction from which the signal is received, said modes including a transverse electromagnetic (TEM) mode and a transverse electric ($TE_{10}$) mode, a pair of spaced concentric tubular members defining an annular chamber therebetween in axial alignment with the annular space between the reflectors, one of which tubular members changes its shape from end to end, means connecting the reflectors to respective ones of the said spaced tubular members to form an annular transition space communicating the space between the reflectors with said annular chamber, said transition space being shaped to convert the aforesaid TEM and $TE_{10}$ modes existing in the space between the reflectors to TEM and $TE_{11}$ modes respectively in the annular chamber, four probes extending into the chamber at 90° intervals therearound to define two pairs of opposed probes, said probes responding to the characteristics of the said modes in the annular chamber at the respective probe locations, and means for combining the mode components sensed by the said pairs of opposed probes to produce signals from which the direction of a received signal can be determined, said combining means including a plurality of hybrid circuits and means coupling the said probes to the said hybrid circuits.

2. A direction finding antenna assembly combining in a single structure a collinear antenna array and a horn antenna structure comprising a horn antenna structure including a pair of spaced axially aligned reflector members shaped to define an annular open sided space capable of receiving and responding to signals transmitted from remote locations by establishing in said space standing microwave signals having configurations that depend on the direction from which a signal is received, said microwave signals being present in said space in a transverse electromagnetic (TEM) mode, and in a transverse electric ($TE_{10}$) radial-line mode, means including conductive extensions of said spaced reflector members, said extensions defining an annular throat and an annular chamber communicating with the space between said reflectors, said throat being constructed to convert the standing wave TEM and $TE_{10}$ modes present in the space between the reflectors into TEM and $TE_{11}$ modes in the chamber, four coupling probes positioned at equispaced locations around the conductive extensions of the reflectors and extending into the annular chamber, said probes being positioned to form two pairs of opposed probes positioned to respond to the characteristics of the said microwave TEM and $TE_{11}$ modes in the annular chamber at the locations thereof, first and second hybrid circuits each having a pair of input and a pair of output ports, said hybrid circuits being constructed to combine signal components introduced at the input ports thereof, means for coupling the probes of one of said pairs of opposed probes to the input ports of the first hybrid circuit, means for coupling the probes of said other pair of opposed probes to the input ports of the second hybrid circuit, said first and second hybrid circuits combining the inputs received at their respective input ports to produce an output at one of the output ports representing a combination of the in-phase signal components sensed by the said opposed probes and an output at the other output port representing a combination of the out-of-phase signal components, means for mounting said collinear antenna array in the assembly in axial alignment with the horn structure, and means including coaxial feeder connection means for the collinear array, said connection means extending through the horn structure.

3. The assembly defined in claim 2 including third and fourth hybrid circuits each having a pair of input ports and a pair of output ports, one of said output ports of the third and fourth hybrid circuits having an output thereat representing a combination of the in-phase components of the signals introduced at the input ports and the other output ports of said third and fourth hybrid circuits having outputs thereat representing a combination of the out-of-phase components of the said signals introduced at the input ports, means coupling the respective output ports of the first and second hybrid circuits at which the combination of the in-phase signal components exist to the input ports of the third hybrid circuit, means coupling the respective output ports of the first and second hybrid circuits at which the combination of the out-of-phase signal components exist to the input ports of the fourth hybrid circuit, and means for loading one of the output ports of said third hybrid circuit.

4. The assembly defined in claim 3 including means for changing the phase of one of the output signals of the second hybrid circuit relative to the corresponding output signals from the first hybrid circuit.

5. In a direction finding antenna assembly the combination of axially aligned collinear and horn antenna structures one of which is fed by means which extend through the other, the horn structure being defined by spaced annular reflectors constructed to establish TEM and $TE_{10}$ modes therebetween in response to receipt of signals transmitted by a remote source, means including extensions of the spaced reflectors defining an annular chamber communicating with the space between the reflectors, the construction of said chamber and the communication between the chamber and the space between the reflectors being constructed to convert the TEM and $TE_{10}$ modes established between the spaced reflectors into corresponding TEM and $TE_{11}$ modes in the chamber, first an second pairs of coupling probes extending into the chamber at spaced locations therearound to respond to the strengths of the signal modes thereat, first and second hybrid circuits each having a pair of input and a pair of output ports, means coupling the probes of one of said pairs respectively to the input ports of said first hybrid circuit, means coupling the probes of said other pair of probes respectively to the input ports of said second hybrid circuit, each of said hybrid circuits being constructed to combine the signals it receives at its input ports including means for combining the signals to produce an output at one of its output ports which represents the combined in-phase components of the input signals and an output at its other output port which represents the combined out-of-phase components of the input signals, a third hybrid circuit having a pair of input and a pair of output ports, means coupling the output ports of said first and second hybrid circuits where the combined in-phase components exist to respective input ports of said third hybrid circuit, a fourth hybrid circuit having a pair of input and a pair of output ports, means coupling the outputs of said first and second hybrid circuits where the combined out-of-phase components exist to the respective input ports of said fourth hybrid circuit, said last named coupling means including means for changing the phase of the output at one of the output ports of said second hybrid circuit by approximately 90° relative to the output at the corresponding output port of said first hybrid circuit.

6. The direction finding antenna defined in claim 5 wherein said means for changing the phase of the output of one of the output ports of said second hybrid circuit relative to the output at the corresponding output port of said first hybrid circuit includes means forming a longer coupling path between the said one output port and the input port at the fourth hybrid circuit to which it is coupled relative to the length of the coupling means between the corresponding output port of said first hybrid circuit and the other input port at the said fourth hybrid circuit.

7. The direction finding antenna defined in claim 5 including means for tuning at least one of the said hybrid circuits.

8. The direction finding antenna defined in claim 5 including means for predeterminately loading at least one output port of said third hybrid circuit.

9. A direction finding antenna assembly comprising a horn portion including spaced annular reflectors defining an annular outwardly opening spaced therebetween, said space being shaped to respond to the receipt of signals transmitted from remote locations to establish therein signal mode configurations having characteristics corresponding to the direction from which the signal is received, said modes including a transverse electromagnetic (TEM) mode and a transverse electric ($TE_{10}$) mode, a pair of spaced concentric tubular members defining an annular chamber therebetween in axial alignment with the annular space between the reflectors, means connecting the reflectors to respective ones of the said spaced tubular members to form an annular transition space communicating the space between the reflectors with said annular chamber, said transition space being shaped to convert the aforesaid TEM and $TE_{10}$ modes existing in the space between the reflectors to TEM and $TE_{11}$ modes respectively in the annular chamber, four probes extending into the chamber at 90° intervals therearound to define two pairs of opposed probes, said probes responding to the characteristics of the said modes in the annular chamber at the respective probe locations, means for combining the mode components sensed by the said pairs of opposed probes to produce signals from which the direction of a received signal can be determined, said combining means including a plurality of hybrid circuits and means coupling the said probes to the said hybrid circuits, a collinear antenna array including means for mounting said array on the horn portion in axial alignment therewith, and means coupling said array to a source of radiation energy, said coupling means including coaxial coupling means extending through the horn portion.

10. A direction finding antenna assembly comprising a horn portion including spaced annular reflectors defining an annular outwardly opening space therebetween, said space being shaped to respond to the receipt of signals transmitted from remote locations to establish therein signal mode configurations having characteristics corresponding to the direction from which the signal is received, said modes including a transverse electromagnetic (TEM) mode and a transverse electric ($TE_{10}$) mode, a pair of spaced concentric tubular members defining an annular chamber therebetween in axial alignment with the annular space between the reflectors, means connecting the reflectors to respective ones of the said spaced tubular members to form an annular transition space communicating the space between the reflectors with said annular chamber, said transition space being shaped to convert the aforesaid TEM and $TE_{10}$ modes existing in the space between the reflectors to TEM and $TE_{11}$ modes respectively in the annular chamber, four probes extending into the chamber at 90° intervals therearound to define two pairs of opposed probes, said probes responding the the characteristics of the said modes in the annular chamber at the respective probe locations, means for combining the mode components sensed by the said pairs of opposed probes to produce signals from which the direction of a received signal can be determined, said combining means including a plurality of hybrid circuits and means coupling the said probes to the said hybrid circuits, and means forming a space of predetermined dimensions immediately above and immediately below the reflectors in the horn portion, said spaces being constructed to produce a choke effect to minimize undesirable currents and to reduce the elevation of side lobe radiations.